2,989,500
EPOXY RESIN COMPOSITIONS

Abraham Bavley and Francis W. Michelotti, Brooklyn, and Albert E. Timreck, Forest Hills, N.Y., assignors to Chas. Pfizer & Co., Inc., New York, N.Y., a corporation of Delaware
No Drawing. Filed Jan. 29, 1958, Ser. No. 711,809
4 Claims. (Cl. 260—47)

This application is concerned with epoxy resin compositions of unique and useful properties. More particularly, it is concerned with epoxy resin compositions which posses the valuable and desirable properties of being homogeneous, hard and rapidly cured resins of excellent flexural strength and favorable distortion temperature values. Other advantages of the compositions of this invention are made obvious by the following disclosure.

Epoxy resins are used commercially in many varied industrial applications. For example, they are used in various adhesive formulations, protective coatings, laminates and foams. One of the most important industrial uses is in the casting and potting of electronic circuits, insulators and other molded products. Epoxy resins are treated with a curing agent such as a polyamine and anhydrides of polycarboxylic acids at elevated temperatures to accelerate the curing process. The curing agents convert the epoxy resins to a substantially infusible and insoluble product, imparting improved heat resistance and electrical properties. In U.S. Patent 2,324,483, Castan describes the conversion of epoxy resins to a substantially thermosetting cast by employing a polycarboxylic acid anhydride, such as phthalic anhydride, adipic anhydride and succinic anhydride, as a curing agent. Epoxy resins generally consist of a polyether derivative of a polyhydric organic compound such as polyhydric alcohols and phenols containing at least two phenolic hydroxy groups, and are further characterized by the presence of at least two terminal 1,2-epoxy groups per molecule of epoxy resin. Epoxy resins are readily available commercial products.

The function of the acid anhydride in curing epoxy resins is commonly thought to be one of crosslinking the epoxy resin through esterification of the epoxy groups. In curing epoxy resins with polycarboxylic acid anhydrides, the process employed usually involves heating a mixture of the epoxy resin and the acid anhydride at elevated temperatures for substantially long periods of time. From the economic standpoint, it is undesirable to employ high temperatures for long periods of time. In addition, such conditions lead to undesirable discoloration of the product.

It has been surprisingly discovered that the tricarballylic acid anhydride cures liquid epoxy resins prepared from dihydric alcohols or phenols and epichlorohydrin in shorter periods of time than prior art curing agents. Further advantages of tricarballylic acid anhydride are obvious in the resin products obtained by curing the above described epoxy resins with this anhydride, for example, castings. Castings obtained by employing tricarballylic acid anhydride are hard, homogeneous and perfectly transparent and are possessed of the desirable and valuable properties of excellent flexural strength and favorable distortion temperatures. The relative amount of prior art acid anhydrides to be used in curing epoxy resins generally lies in the ratio of from about 0.8 to about 1.2 mole of anhydride for each mole of epoxy group in the resin. Incorporation of amounts of a polycarboxylic anhydride outside this range usually results in a diminishing of the desired properties of the product. The use of the above mentioned range of anhydride generally results in desirable heat distortion values, excellent flexural strength, optimum hardness and other desired properties which make epoxy resin compositions amenable to general industrial use. It has been surprisingly found that the curing agent of this invention may be used in smaller ratio, for example, from about 0.3 to about 0.75 mole for each mole of epoxy group in the resin. The ratio of tricarballylic acid anhydride to epoxy resin imparts excellent flexural strength, optimum hardness and dielectric properties as well as favorable distortion temperatures. For example, an epoxy resin cured with a ratio of 0.4 mole of the present anhydride for each mole of epoxy group possesses a heat distortion temperature of 324° F., optimum hardness and maximum dielectric property. Higher ratios of the anhydride, for example, from 0.8 to 1.2 moles as mentioned above may be employed for curing epoxy resins but, although operable, are not preferred since the resins so cured are not possessed of the desirable properties mentioned above.

The process of curing epoxy resins with tricarballylic acid anhydride may be carried out under varied conditions of temperature and time. The time of heating varies with the temperature and ratio of curing agent used. For example, excellent cure is effected by heating the liquid epoxy resin-tricarballylic acid anhydride mixture at a temperature of from about 140° to about 155° C. in extremely short periods of time, the latter being determined by the amount of curing agent employed. For example, when one mole of tricarballylic acid anhydride per mole of epoxy group in the resin is employed, the resin is cured in 4 to 5 minutes at a temperature of from 145° to 150° C. With a ratio of 0.4 mole of tricarballylic acid anhydride per mole of epoxy group, the resin is cured in 55 minutes at 150° C. With a ratio of 0.75 mole of anhydride, the resin cures after only 25 minutes at a temperature of from 150° to 155° C. The advantage of such rapid cures lies in the diminution of the effect of elevated temperatures which, at times, may lead to considerable discoloration of the product, or a lessening of the flexural strength and heat distortion values. These undesirable effects are particularly noted after curing epoxy resins over long periods of time as is required with many prior art curing agents, time periods of at least two hours at elevated temperatures up to 200° C. being employed. As is the procedure commonly employed in the prior art, the cured resins are subjected to post-curing which usually involves heating the cured resin for time periods of at least 5 hours. The post-curing improves heat distortion values, the flexural strength, hardness, and so forth of the epoxy resins. The post-curing of the present resin compositions is usually effected in about 1 hour in the above cited temperature range. Heating for longer periods of time offers no appreciable advantage. Because of the relatively short curing time required, epoxy resin compositions of the present invention show little, if any, of the high temperature effects described above. Other advantage of the curing agent of this invention is that no amine catalyst need be added in the curing process. In the prior art, amine catalysts are usually added to facilitate curing of the epoxy resin composition. With the curing agent of the present invention, i.e. tricarballylic acid anhydride, no catalyst is required, excellent cures being obtained.

Tricarballylic acid anhydride is readily obtainable by standard methods, described in the literature, for example, Ber., vol. p. 596 (1891). One such method is the dehydration of tricarballylic acid by heating with acetic anhydride in the presence of concentrated sulfuric acid. Tricarballylic acid is also known as propane-1,1,3-tricarboxylic acid.

Liquid epoxy resins mentioned above as complex polyethers of dihydric alcohols and phenols containing at least two terminal, 1,2-epoxy groups may be prepared by standard procedures which appear in the literature, for example, Castan (op. cit.), U.S. Patent 2,444,333, U.S. Patent 2,548,477, U.S. Patent 2,643,239, and U.S. Patent 2,512,996. The epoxy resins may be prepared by reacting epichlorohydrin with a dihydric alcohol or phenol by standard procedures. Such dihydric alcohols are ethylene glycol, propylene glycol, 2,3-dihydroxy butane, diethylene glycol, triethylene glycol and other diols. Suitable phenols are, for example, resorcinol, 1,5-dihydroxynaphthalene, 1,8-bis-(4-hydroxyphenyl) pentadecane and bis-(4-hydroxyphenyl)-2,2-propane. Many such epoxy resins are commercially available under the name of Epon resins from Shell Chemical Corporation or Araldite resins from the Ciba Co., Inc. The physical properties such as viscosity, melting point and so forth of these epoxy resins are described in the literature, for example, in "Epoxy Resins" by H. Lee and K. Neville, McGraw-Hill Book Co., Inc., New York, N.Y., 1957. General discussion of the preparation of epoxy resins from phenols and dihydric alcohols is found in the same text. Liquid epoxy resins employed in the following examples are described in the above mentioned text in terms of their properties which is to be considered a part of this disclosure by reference. In the following examples each of the resins were post-cured by heating for about 1 hour at the curing temperature.

The following examples are given by way of illustration and are not to be construed as limitations of this invention, many variations of which are possible within the scope and spirit thereof.

*Example I*

A mixture of 5 g. (0.032 mole) of tricarballylic acid anhydride and 8 grams of Araldite 6020 was prepared. The mixture was thoroughly stirred to blend the ingredients and heated at 150° C. In 4 minutes, the mixture gelled and on cooling a very pale straw-colored, clear, hard resin was obtained. The heat distortion temperature of the cured resin was found to be 149° F.

Araldite 6020 (Ciba Co., Inc.) is a phenol-epoxy resin which contains approximately 0.40 mole of epoxy group per 100 grams.

*Example II*

A mixture of 5.6 g. (0.035 mole) of tricarballylic acid anhydride and 17.5 grams of Araldite 6020 (Ciba Co., Inc.) was prepared. The mixture was thoroughly stirred to blend the ingredients and heated at 145°–150° C. In 30 minutes, the mixture gelled and on cooling a very pale straw-colored, clear, hard resin was obtained. The heat distortion temperature of the cured resin was found to be 226° F.

*Example III*

A mixture of 5 grams of Epon 828 and 1.2 grams (0.008 mole) of tricarballylic acid anhydride was prepared. The mixture was thoroughly stirred to blend the ingredients and heated at 150°–155° C. In 70 minutes, the mixture gelled and a hard, clear resin was obtained. The heat distortion temperature of the cured resin was found to be 308° F.

Epon 828 (Shell Chemical Corp.) is a phenolic epoxy resin which contains approximately 0.54 mole of epoxy group per 100 grams.

*Example IV*

A mixture of 5 grams of Epon 828 and 1.74 grams (0.011 mole) of tricarballylic acid anhydride was prepared. The mixture was thoroughly stirred to blend the ingredients and heated at 150° C. The mixture gelled in 55 minutes and, on cooling, a clear, hard resin was obtained. The heat distortion temperature was found to be 324° F.

*Example V*

A mixture of 2.4 g. (0.015 mole) of tricarballylic acid anhydride and 6 g. of an epoxy resin containing 0.5 mole of epoxy group per 100 grams, prepared from bis-(4-hydroxypheny)-2,2-propane and epichlorohydrin employing the procedure as described in Example II of U.S. Patent 2,324,483, was thoroughly agitated to disperse the ingredients. The mixture was heated at 140° C. for 60 minutes. After cooling, the casting was hard and clear and had a heat distortion temperature of 220° F.

*Example VI*

A mixture of 1.2 g. (0.008 mole) of tricarballylic acid anhydride and 3.3 g. of an epoxy resin containing 0.60 mole of epoxy group per 100 grams, prepared from ethylene glycol and epichlorohydrin employing a procedure as described in Example I of U.S. Patent 2,512,996, was thoroughly agitated to disperse the ingredients. The mixture was heated at 150°–155° C. for 55 minutes. After cooling, a clear, hard casting was obtained. The heat distortion temperature of the cured resin was found to be 305° F.

*Example VIII*

A mixture of 50 g. of tricarballylic acid and 40 g. of acetic anhydride and 0.1% of concentrated sulfuric acid was heated on a steam bath until homogeneous. The mixture, on cooling, solidified and was filtered. After washing with ether, the solid product was recrystallized from chloroform-glacial acetic acid mixture to give pure product, M.P. 144.1° C.

What is claimed is:

1. The thermosetting resin composition which comprises the heat reaction product of (1) a liquid epoxy resin consisting of a polyether, said polyether containing at least two terminal 1,2-epoxy groups per molecule of epoxy resin and being prepared by reacting epichlorohydrin with an organic compound selected from the group consisting of dihydric alcohols and dihydric phenols; and (2) from about 0.3 to about 0.75 mole of tricarballylic acid anhydride per mole of epoxy group in said epoxy resin.

2. A process for the preparation of a thermosetting resin composition which comprises heating (1) a liquid epoxy resin consisting of a polyether, said polyether containing at least two terminal 1,2-epoxy groups per molecule of epoxy resin and being prepared by reacting epichlorohydrin with an organic compound selected from the group consisting of dihydric alcohols and dihydric phenols; and (2) from about 0.3 to about 0.75 mole of tricarballylic acid anhydride per mole of epoxy group in the epoxy resin, at a temperature of from about 140° C. to about 155° C.

3. The thermosetting resin composition which comprises the heat reaction product of (1) an epoxy resin consisting of a polyether derived from a polyhydric phenol, said polyether containing at least two terminal 1,2-epoxy groups per molecule of epoxy resin and prepared by reacting bis-(4-hydroxyphenyl)-2,2-propane and epichlorohydrin, and (2) from about .03 to about 0.75 mole of tricarballylic acid anhydride per mole of epoxy group in the epoxy resin.

4. The thermosetting resin composition which comprises the heat reaction product of (1) an epoxy resin consisting of a polyether derived from a dihydric alcohol, said polyether containing at least two terminal 1,2-epoxy groups per molecule of epoxy resin and prepared by reacting ethylene glycol and epichlorohydrin, and (2) from about 0.3 to about 0.75 mole of tricarballylic acid anhydride per mole of epoxy group in the epoxy resin.

References Cited in the file of this patent

UNITED STATES PATENTS

| | | |
|---|---|---|
| 2,324,483 | Castan | July 20, 1943 |
| 2,569,920 | Buck et al. | Oct. 2, 1951 |

OTHER REFERENCES

Dearborn et al.: Jour. of Polymer Science, vol. 16, pp. 201–208, Apr. 1955.

Berichte: Vol. 24, page 596 (1891).